United States Patent [19]
Yost, Jr. et al.

[11] 4,006,477
[45] Feb. 1, 1977

[54] PULSE COHERENT TRANSPONDER WITH PRECISION FREQUENCY OFFSET

[75] Inventors: Russell R. Yost, Jr., Phoenix; Eric J. Carlson, Mesa, both of Ariz.

[73] Assignee: Motorola, Inc., Chicago, Ill.

[22] Filed: Jan. 6, 1975

[21] Appl. No.: 538,700

[52] U.S. Cl. .................................... 343/6.8 R
[51] Int. Cl.[2] ................................. G01S 9/58
[58] Field of Search ............... 343/6.8 R, 6.8 LC

[56] References Cited
UNITED STATES PATENTS

| | | | |
|---|---|---|---|
| 2,671,850 | 3/1954 | Marcou | 343/6.8 R X |
| 3,079,557 | 2/1963 | Crabtree | 343/6.8 R X |
| 3,384,893 | 5/1968 | Prestwood | 343/6.8 R |
| 3,636,453 | 1/1972 | George | 343/6.8 R X |
| 3,683,279 | 8/1972 | Weinberg et al. | 343/6.8 R X |
| 3,685,050 | 8/1972 | Cartwright | 343/6.8 R X |
| 3,896,441 | 7/1975 | Richmond | 343/6.8 R X |

Primary Examiner—Malcolm F. Hubler
Attorney, Agent, or Firm—Michael D. Bingham

[57] ABSTRACT

A radar reply transponder for use with existing radar tracking systems wherein a reply pulse is generated and trasmitted in response to an associated interrogation pulse. The reply pulse is delayed in time and offset in frequency by a precise amount with respect to the interrogation pulse, but it is nevertheless phase coherent therewith so as to preserve the required Doppler frequency information and thereby permit accurate velocity measurements. Phase coherence is effectively maintained by utilizing a single continuously operating local oscillator for down-converting the received interrogation pulse to an intermediate frequency as well as up-converting the signal information to provide the delayed and frequency offset reply pulse. The precision frequency offset is obtained by switching in an additional reactance element in the oscillator-determining circuitry during the time up-converting is being effected. The radar transponder may thus be used in a high-vibration environment with no substantial introduction of error in velocity measurements caused by using two independent oscillators to formulate the frequency offset.

13 Claims, 8 Drawing Figures

PULSE COHERENT TRANSPONDER WITH PRECISION FREQUENCY OFFSET

BACKGROUND OF THE INVENTION

This invention relates in general to transponder apparatus and more particularly to an improved reply radar transponder adaptable for use within a radar target, such as a missile or other airborne craft, and wherein delayed reply pulses may be generated and transmitted in response to received interrogation pulses from ground or tracking radars. It is intended that such delayed reply pulses be offset in frequency by a predetermined, precise amount, but nevertheless, be phase coherent with respect to the received incoming interrogation pulses.

Radar transponders of the type herein disclosed are adapted for inclusion within a vehicle acting as a moving radar target so as to provide appropriate reply pulses in response to incoming interrogation pulses from a tracking or ground station radar. The power level of the reply pulses is at substantially higher power levels than would be otherwise obtained from echos or "skin tracking" pulses reflected by the transponder-bearing craft or target. In this manner, the tracking range of the radar system as a whole is substantially extended.

In systems of this type, it is known to effect a delay in the transmission of the associated reply pulses for some predetermined time so as to avoid interference with "skin echos" reflected from the surface or surfaces of the transponder bearing vehicle. In addition, it is also known that the reply pulses may be generated and transmitted in phase coherence with the received interrogation pulses so as to preserve the appropriate Doppler frequency information used to determine instantaneous velocity of the referenced target. By phase coherence, it is meant that there is some predictable (in the sense of, "known to the radar") phase relation that is established and maintained between the received interrogation pulses and the transmitted, albeit delayed, reply pulses. Notwithstanding the foregoing, interferences still may be encountered in the prior systems, notably from ground returns and/or other passing reflections. This is possible because interrogations pulses and the associated reply pulses have heretofore been maintained at substantially the same carrier frequency.

Accordingly, it is an object of the present invention to provide an improved radar reply transponder for use in existing radar systems which effectively eliminates interference from ground returns and other undesirable passive reflections.

Another object of the present invention is to provide an improved radar reply transponder for precision pulse Doppler velocity measuring radar systems wherein long term frequency stability for the transponder's local oscillator as heretofore required may be substantially relaxed.

A more particular object of the present invention is to provide improved reply transponder apparatus which provides an appropriate reply pulse in response to interrogation from the tracking station, which reply pulse is phase coherent but delayed in time and offset in frequency.

Still another object of the present invention is to provide an improved reply transponder of the foregoing type wherein the instantaneous frequency of each transmitted reply pulse is offset in frequency from that of the received interrogation pulse by a predetermined, selectable, but precise amount.

Yet another object of the present invention is to provide an improved reply transponder of the foregoing type wherein the down-converting of received interrogation pulse information and the up-converting of the offset reply pulse to be transmitted is effected by a common local oscillator with a switchable reactive element.

A further object of the present invention is to provide an improved transponder of the foregoing type wherein the down-converting of received interrogation pulse information and the up-converting of the offset reply pulse to be transmitted is effected by a common frequency modulated local oscillator.

A still further object of the present invention is to provide an improved reply transponder of the foregoing type wherein the down-converting of a received interrogation pulse information and the up-converting of the offset reply pulse to be transmitted is effected by a common moduated oscillator which is driven by an input signal derived by selecting a harmonic of the pulse rate frequency.

SUMMARY OF THE PRESENT INVENTION

The invention in its broader aspects pertains to a radar reply transponder for inclusion within a vehicle serving as a moving radar target, such as a missile or other airborne or space-borne craft. The transponder is intended to generate and transmit a high level reply pulse in response to a received interrogation pulse, the former being delayed in time and offset in frequency by a predetermined, precise amount, but nevertheless phase coherent with the received interrogation pulse information. In this regard, a local oscillator for the transponder is utilized to down-convert the incoming interrogation pulse to a desired intermediate frequency as well as to up-convert the reply pulse to be transmitted to its final offset in frequency. The precision offset in frequency for the transmitted reply pulse is obtained by switching in an additional reactive element in the circuitry of the local oscillator circuit, which continues to oscillate continuously during the reactance addition. Since the same continuously running local oscillator is utilized for both down-converting as well as the subsequent up-converting, phase coherence is maintained and long term frequency stability requirements for the local oscillator are greatly reduced. To avoid interference between the incoming interrogations pulses and the outgoing reply pulses, a predetermined time delay is normally introduced before the latter are generated and transmitted. Phase coherence is preserved by having the phase of the local oscillator sinusoid affecting the delayed reply pulse information and the phase of the local oscillator sinusoid used to initially down-convert to the intermediate frequency established and maintained in some relationship that is repeated from pulse-to-pulse.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description taken in conjunction with the accompanying drawings, in which:

DETAILED DESCRIPTION OF THE PREFERRED EMBODIMENTS

Figure 1:
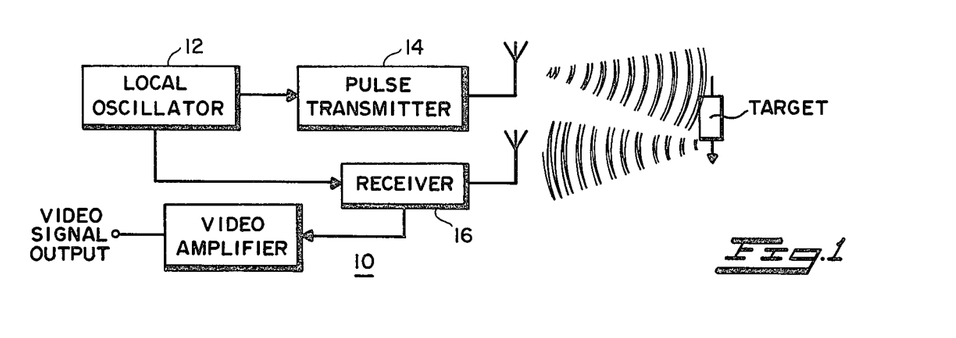
FIG. 1 is a block diagram of a radar system for indicating the presence of a reference target and measuring the velocity thereof by the Doppler frequency translation of the return signal.

Referring now to the drawings, a radar system 10 is depicted in block diagram form in FIG. 1, which system is intended to indicate the presence of a target as well as its velocity by means of the gathering and measuring of the Doppler shift information inherent when tracking a moving target. As shown, the radar system, at the tracking station, includes a local oscillator arrangement 12 for generating a reference frequency which, in conjunction with an associated transmitting apparatus 14, results in the generation and transmissions of recurrent pulses of a given frequency and power level, and at a particular pulse repetition frequency (PRF).

As indicated, the reply signal information is returned and picked up by appropriate receiver apparatus 16 and subsequently converted to useful information for visual display or other purposes. The reply pulse information may simply be the result of a "skin echo" reflected from one or more surface areas of the target vehicle, or the same may be generated separately and independently by an associated reply transponder unit on board the target vehcile itself. As will become apparent hereinafter, it is the latter to which the present invention is directed.

Figure 3A:
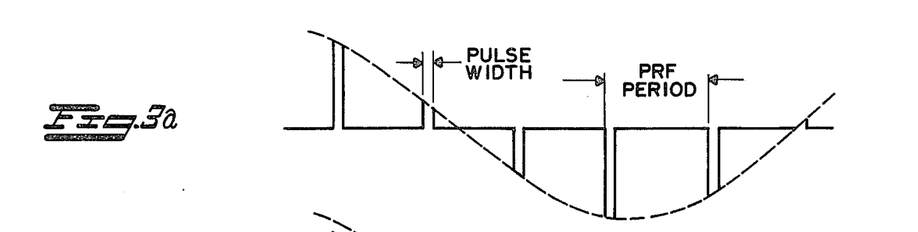
FIG. 3A is a graphic representation showing, for a pulse radar, the generation of the Doppler frequency information caused by a moving target.

In any event, the received reply pulse information at the tracking or ground station is converted in the presence of an applied reference signal from the local oscillator 12 to a form suitable for video presentation to indicate the presence of a reference target. In addition, the shift in frequency between the outgoing and incoming signal information, i.e., Doppler shift, is utilized to compute the radial velocity or speed of the target in a manner well understood in the art. More properly, it is the rate of change of the phase of the carrier of the received reply pulse information with respect to that of the transmitted pulse train that contains the Doppler velocity information. This is represented graphically in FIG. 3A which shows the "zero IF" output of a mixer supplied by the local oscillator 12 of FIG. 1 and the received echo signal. With pulse width and repetition period of some given, but fixed parameters, as indicated, the change of phase for the returning pulse information will result in mixer output pulses whose peaks conform to a particular Doppler sinusoid envelope, as indicated by the dotted line. As mentioned previously, the utilization of such Doppler velocity information to provide an indication of the speed of the referenced target is known in the art and should not require further and more detailed anyalysis.

As also previously mentioned, it is known to provide a reply transponder within a moving target vehicle whereby the tracking range of the overall radar system may be significantly increased. The transponder is intended to generate and transmit a reply pulse, at a relative high output power level, in response to an incoming interrogation pulse received from an associated tracking station. The reply pulse may be delayed, but must remain phase coherent with respect to the received interrogation pulse so as to properly preserve the generated Doppler velocity information. The effect of random pulse-to-pulse phase errors in the generated reply pulses is likewise portrayed graphically in FIG. 3B. As will be appreciated, there will be miscalculations of target velocity as a result. The fixed delay in transmitting the respective reply pulses is primarily to avoid interference at the transponder between its received and transmitted signals; secondarily it avoids interference between the transponder replies and the "skin echos" that may be received by the interrogating tracking station.

In addition, it will be readily understood that it is inefficient to attempt the required time delay at the operating radio frequency of the radar system, which may be on the order of 5600 mHz. It is much more practical and efficient to down-convert to some intermediate frequency, say in the 80 to 100 mHz range, before introducing the desired time delay, and then up-convert back to the desired operating or carrier frequency.

Up until now, the instantaneous frequency of the reply pulse was the same, or within a substantial narrow frequency range, of that of the interrogation pulses. Accordingly it was possible, indeed attractive, to utilize a common local oscillator in the transponder circuitry to effect both down-converting of the incoming interrogation and up-converting to the reply pulses to be transmitted. In this manner phase coherency was established and effectively maintained as required.

The prior approach of maintaining both the interrogation pulses and the reply pulses at substantially the same instantaneous frequency, however, has not proven entirely satisfactory. Operational problems are particularly apparent in this regard with respect to ground returns and other undesirable passive reflections. One way to avoid these difficulties would be to effect some predetermined frequency offset for the reply pulses. In this way, the disruptive ground returns and the like would not be within the bandwidth of the tracking station receiver apparatus, which would be turned away from the transmitted signal frequency to select the frequency offset transponder reply. However, this unfortunately creates other and additional difficulties, which, until now, have not been successfully overcome.

Figure 4:
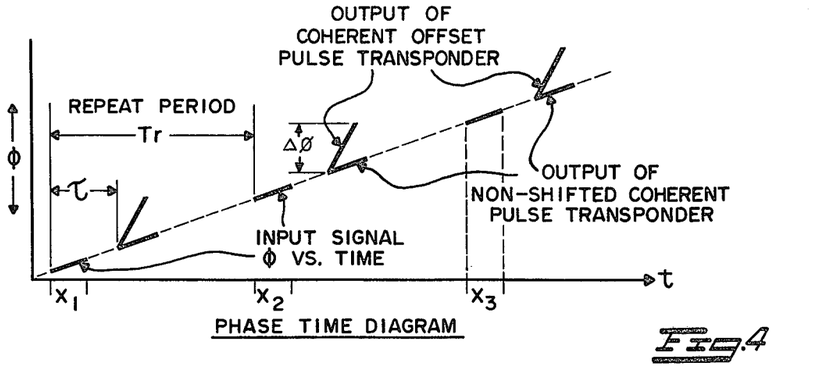
FIG. 4 is plot of instantaneous phase versus time useful in understanding certain aspects of the phase coherence requirement.

It will be realized that, notwithstanding a shift or offset in carrier frequency for the reply pulses, phase coherence must nevertheless be maintained. That is, it is essential to insure that the sinusoidal waveform phase of each reply pulse be related to the waveform phase of its interrogation pulse in the same way for every interrogation pulse, even though the instantaneous reply frequency during each reply pulse is not the same as that of the interrogation. This may be more easily appreciated by reference to the phase vs time diagram of FIG. 4, which shows the required phase coherence of the system as a whole. Input or interrogation signals may be assumed to be generated in time intervals $X_1$, $X_2$, and $X_3$. Reply pulses (as received in the radar) arrive delayed by a time $\tau$. The operating or carrier frequency of the transmitted pulses is indicated by the slope shown in the dotted line, since instantaneous frequency is the same derivative of phase. If the reply pulses are substantially at the same frequency as the interrogation pulses, they will of course have the same slope, as indicated. However, if the output of the coherent pulse transponder is offset in frequency, the slope of the generated reply pulses will not be the same, but at some different slope. However, the phase history of such offset reply pulses must nevertheless be related to the phase history of the interrogation pulses in such a manner that corresponding portions (for example, leading edges) can be connected by straight lines of the same slope as that of the interrogation pulse phase history. Inasmuch as the dashed line represents the phase history of the carrier, or central spectral line, of the interrogation pulse spectrum, it is intuitively obvious that the offset-frequency reply pulse train will have a spectral component at the same frequency, providing the phase increment $\Delta\phi$ (FIG. 4) is not a multiple of $2\pi$, which can be avoided by controlling the pulse duration and frequency offset.

Even when the carrier frequency spectral component is missing, it can be regenerated in the tracking radar receiver by application of coherent-on-receive techniques as described in detail in the "Radar Handbook," Section 5.5, 1970 edition.

Figure 3B:
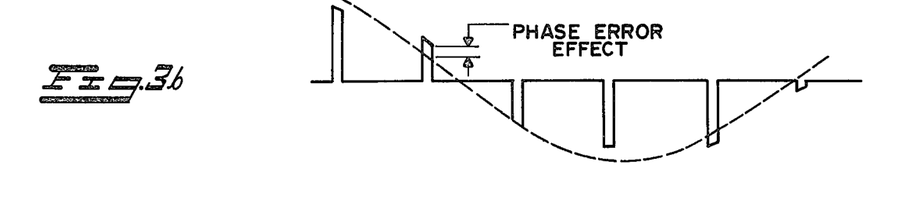
FIG. 3B is a graphic representation of the effect of phase error in the generated reply pulses with respect to the Doppler frequency information.

The manner of achieving the frequency offset is important, if phase errors as illustrated in FIG. 3B are to be maintained negligible.

The high-vibration environment in which the reply transponder must be placed can give rise to intolerable velocity measurement errors if separate oscillators are used in the transponder apparatus to effect the frequency offset, or alternately, if on-symmetric multiplier chains are employed to produce two reference frequencies with the desired offset. Such circuit arrangement could result in a phase history representing noisy FM, so that in FIG. 4 the reply pulse phase history would lie on a non-straight line having an average slope corresponding to the reply frequency; vibration induced deviations from a straight line as well as slow drift slope changes would accumulate intolerable phase errors. Moreover, a Doppler shift in the received reply pulses results in the straight line connecting corresponding portions of the reply pulse phase histories having a slope that differs from this frequency of the interrogating pulses. Hence, it is clear that drift of the offset frequency generated by two independent local oscillators could not be distinguished from Doppler shift, and could cause a large error in velocity measurement.

Figure 2:
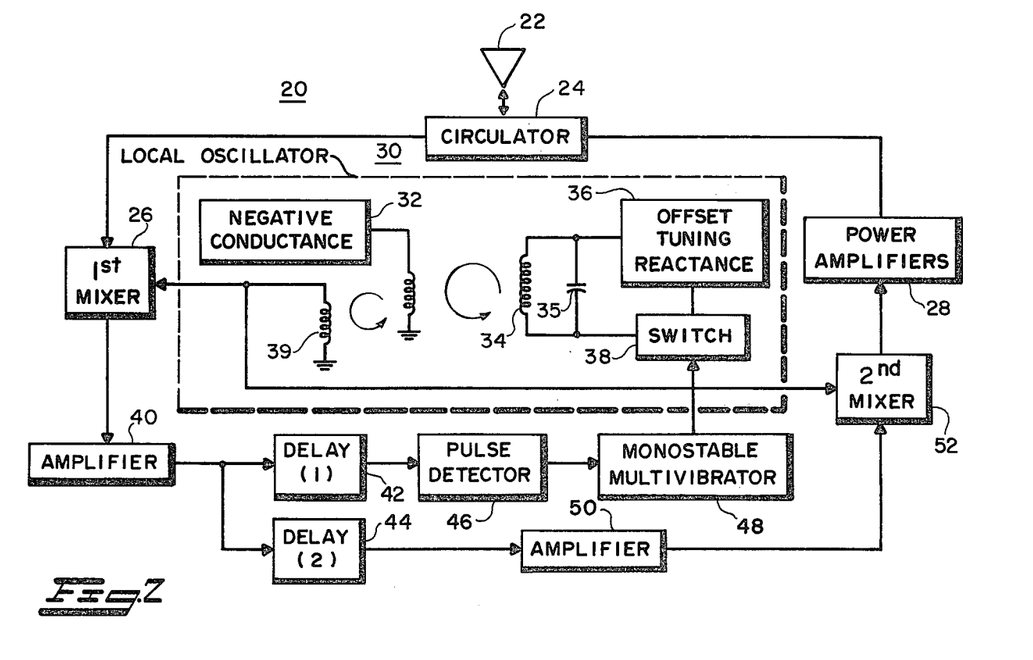
FIG. 2 is a partial block and schematic diagram of a radar reply transponder constructed in accordance with the present invention.

These operational difficulties, however, have been successfully avoided in the apparatus constructed in accordance with the present invention. As illustrated in FIG. 2, the reply transponder 20 includes a single continuously operating oscillator 30 to both down-convert the incoming interrogation pulses as well as up-convert the reply pulses to be transmitted. The precision frequency offset in the carrier frequency of the generated reply pulses is conveniently obtained by switching in an additional reactance element at the appropriate time as will be explained in more detail hereinafter. At the same time, phase coherence is assured by maintaining continuous oscillation during the frequency change.

Transponder 20 includes antenna 22 coupled to circulator device 24. Circulator 24 selectively applies received signal information from antenna 22 to a first mixer stage 26 as well as transferring signal information from power amplifier stage or stages 28 to antenna 22 for transmission while attenuating signal feed through to mixer 26. Local oscillator 30 is utilized to generate a reference signal at some predetermined frequency. Oscillator 30 typically includes a negative conductance arrangement for effecting the required oscillatory action, which arrangement is indicated generally at 32. The frequency determining elements for oscillator 30 comprise an inductance 34 and a capacitance 35 forming a first parallel tuned circuit, and also an additional tuning reactance element indicated at 36 which may be effectively switched in or out of the overall circuitry by a fast acting switching arrangement 38. With a signal applied from oscillator 30 through transformer winding 39 to mixer 26, the incoming interrogation signal information is down-converted to a designated intermediate frequency. For the structure at hand, the carrier frequency of the interrogation signal information may be on the order of 5600 mHz with the intermediate frequency being in the range of 100 mHz.

The down-converted intermediate frequency signal information is applied in amplifier stage 40 and applied to delay lines 42 and 44, respectively. The signal through delay line 42 is applied to pulse detector 46 for controlling monostable multivibrator 48, the output of which is coupled to the fast acting switch arrangement 38. At the same time, the signal information through delay line 44 is amplified in amplifier stage 50 and applied to the up-converter or second mixer stage 52. The up-converting occurs when a signal is simultaneously applied from oscillator 30.

As may be appreciated, the coherent frequency offset is effected at a predetermined time interval following down-conversion of the incoming signal information and mixer stage 26, when the resonating frequency of the local oscillator 30 is effectively altered by switching in the additional tuning reactance indicated at 36.

When a pulse is detected by pulse detector 46, multivibrator 48 generates an appropriate control voltage to activate switch 38 and thereby switch in the offset tuning reactance 36. The local oscillator is then altered to an operating frequency of $(f_{LO}+\Delta f)$. Thereafter, the intermediate frequency signal information emerges from delayed line 44 and after being suitably amplified in amplifier 50, the same is applied to the up-converter or second mixer 52, wherein suitable up-conversion takes place and the instantaneous frequency of the sum frequency signal out of second mixer 52 has been shifted upwards by $\Delta f$.

It should, of course, be noted that the change in operating frequency of local oscillator from its normal or initial value, $f_{LO}$, to its selected offset value $(f_{LO}+\Delta f)$ occurs after the end of the pulse generated by multivibrator 48, but before the leading edge of the down-converted interrogation pulse emerges from delay line 44. The local oscillator 30 remains at the referenced offset frequency until the up-converted pulse passes second mixer 52, and is applied to power amplifier 28. Local oscillator 30 is then permitted to return to its initial frequency of $f_{LO}$. As may be appreciated, delay 42 is necessary to insure that the oscillator frequency $f_{LO}$ does not change during the time interval of the incoming interrogation pulse. This action could, alternately, be accomplished by utilizing the trailing edge of the incoming pulse, or by an additional monostable multivibrator.

It will also be noted that the change in oscillator frequency from the initial value $f_{LO}$ to the $(f_{LO}+\Delta f)$ off set frequency is always a precise and fixed amount, since the reference change is effected by switching in the passive reactance circuit element 36. If the pulses are periodic, then discussion here applies to periodic pulse train. Because of the pulse-to-pulse coherence, the line spectrum of the outgoing offset frequency pulses is shifted from the in-coming signal spectrum by an integral number times the pulse repetition frequency. This, of course, causes the shifted frequency to appear as being caused by a relatively very high velocity, such that the Doppler shift is much larger than the prf. However, existing pulsed-radar tracking apparatus already includes provisions for effectively removing ambiguities of frequency measurements of this sort and will, without more, resolve the reference frequency shift. No special receiver or signal processing circuitry is required. (If the pulses are non-periodic, or random, coherent-on-receive techniques, as described in the aforementioned literature, can be employed to regenerate the carrier component.) The only practical consequence of the offset frequency is an apparent reduction in received signal power at the transmitted carrier frequency and a corresponding enhancement near the offset frequency. That is, the power level of the reply pulses received at the tracking station will merely appear to be at some lower level of amplitude than would otherwise be obtained in those instances where the carrier frequency thereof substantially matches that of the interrogation pulses. The tracking radar receiver must, of course, be tuned to the offset frequency. In practice, it has been found that a frequency offset of approximately 20 mHz provides satisfactory operation.

Figure 6:
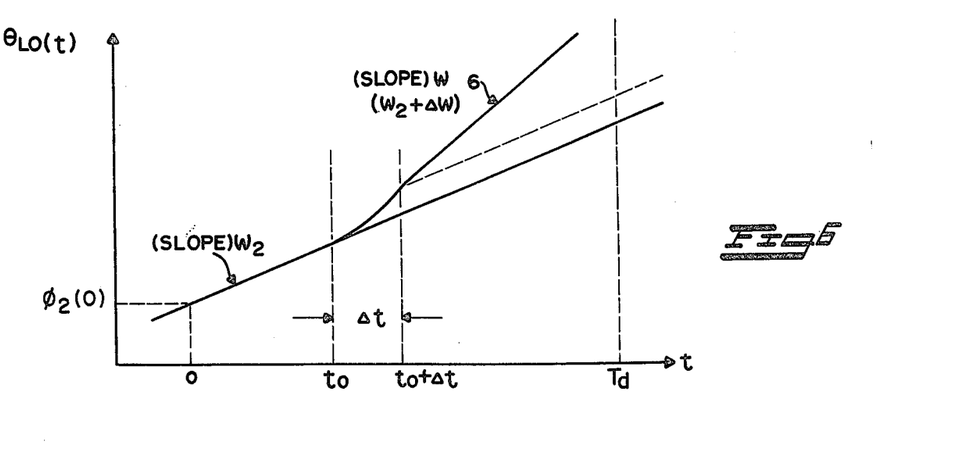
FIG. 6 is a phase vs time diagram of the local oscillator output signal.

In regard to effecting the required phase coherency between in-coming and out-going, but frequency offset, signal information, a reference to FIG. 6 may further aid in the understanding. FIG. 6 represents a phase versus time diagram with respect to the operating characteristics of the local oscillator 30. At time 0, corresponding to the leading edge of a received pulse, the phase of oscillator 30 is the reference phase $\phi(0)$.

The slope at this point is indicated as $\omega_2$. At $t=t_0$, fast acting switch 38 begins to close, which then causes the rate of change of phase for oscillator 30 to begin to increase by some predetermined amount. It may be fairly assumed that the frequency at this point increases linearly with time and, thus, the phase increases parabolically. Although it is not essential to know the exact phase trajectory, during $\Delta t$, the transition period of the switch, it is important that the oscillator 30 nevertheless repeat this trajectory for each interrogating pulse, except for the non-consequential phase shift, $\phi_2(0)$, that may vary from pulse to pulse but remains constant while each pulse is passing through the transponder; the shift $\phi_2(0)$ is cancelled by the sequential down- and up-conversion process. At $t=t_0+\Delta t$, the oscillator 30 reaches its new steady state phase rate and the slope at this point, $\omega_6$, will be equal to $\omega_2 + \Delta\omega$. Accordingly, the phase increment of oscillator 30 in the time interval $T_d$, corresponding to the leading edge of the delayed reply pulse, is composed of three component parts. The first part is due to the initial slope, or $\omega_2 T_d$; the second is due to the extra phase accumulated during $\frac{1}{2}t$, or $(1/2)\Delta\omega \cdot \Delta t$; and the third component of phase at $t=T_d$ is due to the increase in frequency, $\Delta\omega$. This component has a magnitude of $\Delta\omega[Y_d-(t_0+\Delta t)]$.

If the local oscillator phase history in the absence of the addition of the switched reactance varies to any degree from a straight line relation $\omega_2 \cdot t$ this can be considered by adding thereto a phase error term $\phi_2(t)$. Analysis can then relate errors in resultant apparent velocity measurements to this phase error term. Another source of velocity variational error in the described method is pulse-to-pulse variation in $t_0$, the time interval between the arrival of an interrogating pulse and the beginning of the change in the local oscillator frequency. Analysis similarly can relate velocity errors to variations in the delay time $T_d$.

A summary of the allowable transponder errors, each of which result in ½ radian of phase error, corresponding to a Doppler frequency error of no more than 1.2 Hz rms, (or an rms velocity error of $0.6\lambda_0$ per second, where $\lambda_0$ is the wavelength at the carrier frequency, $f_0$) is given in the following table:

| IDENTITY | ALLOWABLE ERROR |
| --- | --- |
| LO short term frequency error during delay $T_d$. | 70 kHz rms frequency deviation. |
| Delay line stability | $\Delta T_d = 1.3$ nsec |
| Timing stability | $\Delta t_o = 4$ nsec |
| Offset frequency stability | $\Delta(\Delta f) = 80$ kHz. |

It has been determined that these error sources can be held to acceptable limits by exercising state of the art workmanship and acceptable engineering practices.

It will be recognized that the embodiment described above can be used even when the radar pulses are non-periodic or random in timing.

Figure 5:
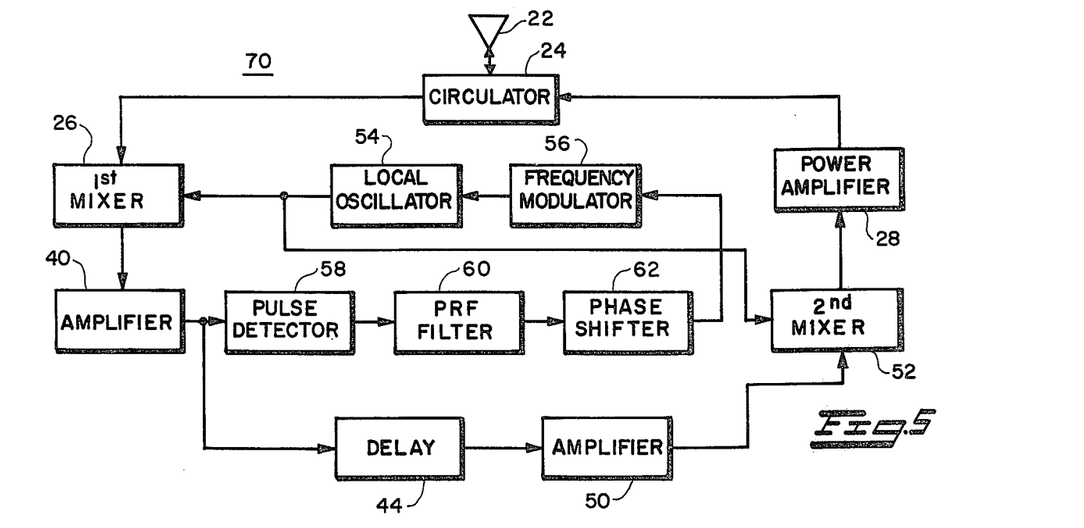
FIG. 5 is a block diagram of a radar reply transponder constructed in accordance with another embodiment of the present invention.

FIG. 5 illustrates another embodiment of the present invention useful when the pulses ae periodic, in which the same reference numbers are used for components corresponding to like components of FIG. 2.

As illustrated in FIG. 5, reply transponder 70 comprises an antenna 22 coupled to circulator 24. Circulator 24 selectively couples the received pulse train signal from antenna 22 to a first mixer stage 26, as well as coupling signal information from power amplifier 28 to antenna 22 for transmission. Local oscillator 54 is utilized to generate a frequency modulated reference signal at a reference frequency. The output of local oscillator 54 is supplied to a second input of mixer 26 for deriving a down-converted intermediate frequency at the output of mixer 26. The down-converted signal is amplified by amplifier 40 and applied to delay line 44 and pulse detector 58, respectively. The output signal from pulse detector 58 is then applied to PRF filter 60 which is connected to phase shifter 62. The output signal from phase shifter 62 is then applied to frequency modulator 56 for frequency modulating local oscillator 54. Simultaneously, the down-converted signal coupled through delay line 40 is amplified in amplifier stage 50 and applied to the up-converter or second mixer stage 52. The up-converting occurs when a signal is simultaneously applied from oscillator 54 to second mixer 52. The up-converted signal information is then amplified by power amplifier 28 and applied to antenna 22 for transmissions.

The embodiment shown in FIG. 5 may be used for the case in which the input pulse train, received at antenna 22, is periodic at a fixed PRF. IN operation, the input signal may be processed, in a well-known manner, to obtain a filtered version of the PRF at the output terminal of PRF filter 60. This filtered signal may be used to frequency modulate local oscillator 54 in synchronism with the incoming pulses. The modulating signal is phase-shifted by phase shifter 62 so that the instantaneous freuqency of local oscillator 54, during the time the interrogation pulse is passing through first mixer 26, is offset from the frequency at the time the delayed (by delay device 44) and amplified (amplifier 50) pulse is applied to second mixer, 52, achieving the desired offset. Again, coherence is assured by the continuous operation of the single local oscillator, 54.

Considering the instantaneous frequency during each output pulse, it can be shown that the envelope of the spectrum of the output pulse train is peaked at the desired offset frequency. However, considering the spectral line frequencies of the frequency modulated (periodic at the prf) local oscillator, it is evident that the spectral line frequencies of the output pulse train are those of the input interrogating pulse train, translated by an integral multiple of the prf.

Figure 7:
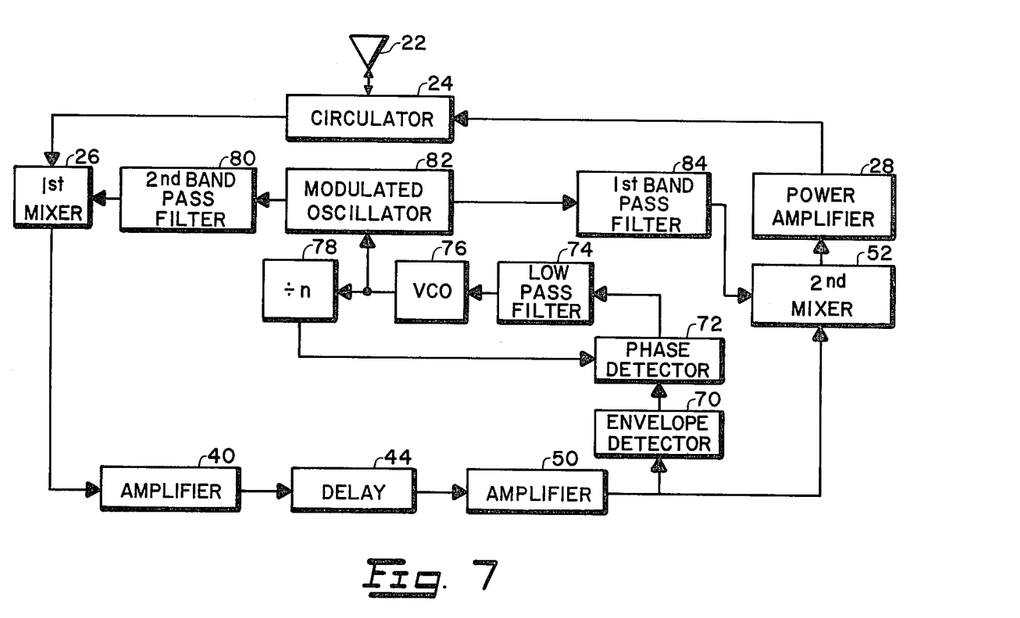
FIG. 7 is a block diagram of a radar reply transponder constructed in accordance with yet another embodiment of the present invention.

FIG. 7 illustrates still another embodiment of the present invention in which the same reference numerals are used for components corresponding to like components of FIG. 2.

As illustrated in FIG. 7 there is shown an improved reply transponder of the foregoing type wherein the downconverting of received interrogation pulse information and the up-converting of the offset reply pulse to be transmitted is effected by modulating the RF carrier by an integral multiple of the PRF.

Two reference signals are applied simultaneously to the down- and up-converters or mixers 26 and 52. The two reference signals are selected by band pass filters 80 and 84, respectively, from the spectrum of an RF carrier modulated by an integral multiple of the PRF. The modulator input signal to modulated oscillator 82 is derived by selecting the *nth* harmonic of the PRF.

However, as the integer, *n*, could be very large, being the transponder offset frequency (e.g., 20 mHz) divided by the PRF (e.g., 1 kHz), the harmonic selection is facilitated by using a phase-locked loop to control the frequency of a voltage controlled oscillator operating at a frequency close to the desired offset frequency. The phase locked loop is illustrated in FIG. 7 as comprising phase detector 72, low pass filter 74, voltage-control oscillator 76, and divide by *n* network 78. The voltage controlled oscillator frequency is divided by *n* to obtain a reference signal for phase detector 72, whose other input is the detected envelope of the periodic interrogation pulses derived from envelope detector 70.

The drift and other incidental variations of the RF carrier frequency of the modulated oscillator would be applied equally to all the modulation sidebands, so that the two up- and down-converter reference frequencies would remain spaced by n·PRF. The phase-locked loop low pass filter, 74, then can be set sufficiently narrow to assure that the voltage controlled oscillator frequency remains at n·PRF in the presence of incoming noise and short-term variations of the RF carrier frequency.

While three embodiments of the invention have been shown and described herein, it will be obvious that certain modifications and alternative constructions may be made without departing from the invention in its broader aspects and, accordingly, the claims as appended hereto are intended to cover all such modifications and alternative constructions that may fall within the true scope and spirit of the invention.

What is claimed is:

1. Radar transponder apparatus for receiving a sequence of interrogation pulses and generating reply pulses that are phase coherent with the interrogation pulses but delayed in time and offset in frequency, by a precise amount, including in combination:
   means for providing a reference signal at a first predetermined frequency, said means being of continuous operation;
   means for down-converting the interrogation pulses to intermediate frequency signal information in the presence of said reference signal at said first predetermined frequency;
   means for delaying said intermediate frequency signal information for a predetermined time interval;
   means receiving said intermediate frequency signal information from said down-converting means, which is coupled to said means for providing a reference signal, for causing the frequency of said reference signal produced thereby to be incremented by a fixed, predetermined amount, the instantaneous phase of said incremented frequency reference signal being related to the instantaneous phase of said reference signal at said first predetermined frequency with said relationship being substantially invariant from pulse-to-pulse of the sequence of received interrogation pulses; and
   means for up-converting said delayed intermediate frequency signal information in the presence of said reference signal at said incremented frequency, said up-converted signal information being a sequence of reply pulses offset in frequency but phase coherent with said received interrogation pulses.

2. The radar transponder apparatus in accordance with claim 1 wherein said means for providing a reference signal at a first frequency includes:
   an oscillator having reactive elements forming a resonant circit at said first predetermined frequency; and
   said means for incrementing the frequency of said reference signal includes means for altering said resonant circit of said oscillator to change its resonant frequency to said incremented frequency without significant alteration of is stored energy.

3. The radar transponder apparatus in accordance with claim 1 wherein:
   said means for providing a reference signal at a first frequency includes an oscillator having passive reactance elements forming a parallel tuned circiut; and
   said means for incrementing the frequency of said reference signal means includes switch means for switching into said parallel tuned circuit at least one additional reactance element.

4. The radar transponder apparatus in accordance with claim 1 wherein:
   said down-converting means includes a first mixer stage; and
   said up-converting means includes a second mixer stage.

5. The radar transponder apparatus in accordance with claim 3 wherein said means for incrementing the frequency of said reference signal further includes;

second means for delaying said intermediate frequency signal information so that said first predetermined frequency of said reference signal does not change during the time interval that the received interrogation pulses are applied to the transponder;

pulse detecting means receiving said intermediate frequency signal information from said second delay means for developing a control signal; and means receiving said control signal for generating a control voltage to activate said switching means, and said reply pulses from said up-converting means are amplified by the transponder before transmission therefrom.

6. The radar transponder apparatus in accordance with claim 2 wherein said oscillator operates without interruption from the reception of each pulse of said sequence of incoming interrogation pulses to the transmission of a corresponding outgoing reply pulse and wherein the integral of the frequency of said oscillator changes with time during the interval when the frequency is changing from said first predetermined frequency to said incremented frequency by amount that is substantially the same for each of the incoming pulses.

7. The radar transponder in accordance with claim 1 wherein the sequence of received interrogation pulses is periodic at a fixed pulse repetition frequency (PRF), including:

said means for providing a reference signal at a first predetermined frequency includes an oscillator stage; and said means for incrementing the frequency of said reference signal includes means for frequency modulating said oscillator in synchronism with said periodic interrogation pulses so that the instantaneous frequency of said first predetermined frequency of said oscillator differs from the instantaneous frequency of said incremented frequency of said oscillator by a predetermined amount.

8. The radar transponder apparatus in accordance with claim 7 wherein said frequency modulating means includes:

modulator means for frequency modulating said oscillator in response to said signal information;

means for detecting and filtering said intermediate frequency signal information from said down-converting means; and phase shifting means for delaying said filtered intermediate frequency signal information so that said reference signal at said first frequency does not change during the time interval that the interrogation pulses are applied to the transponder.

9. Radar transponder apparatus for generating, in response to a sequence of received interrogation pulses which are periodic at a fixed pulse repetition frequency, reply pulses that are phase coherent therewith but delayed in time and offset in frequency by a fixed, precise amount, including in combination:

oscillator means for generating a radio frequency carrier signal;

means coupled to said oscillator means for modulating the same to provide harmonically related frequencies;

frequency selection means coupled to said oscillator means for selecting two reference signals from said harmonically related frequencies, said reference frequencies differing by an integral multiple of the received pulse repetition frequency;

means for down-converting the received interrogation pulses to signal information of an intermediate frequency in the presence of the first of said reference frequencies;

means for delaying said intermediate frequency signal information by a predetermined time interval;

means for up-converting said delayed intermediate frequency signal in the presence of the second of said reference frequencies, said up-converted signal information being offset in frequency from that of said interrogation pulses; and means for amplifying and transmitting said up-converted signal information, said up-converted signal information being a sequence of reply pulses which are phase coherent with said sequence of received interrogation pulses.

10. The radar transponder apparatus in accordance with claim 9 wherein said means for modulating said oscillator means, includes in combination:

detector means for developing a base-band signal which is representative of the envelope of the interrogation pulses; and means for generating a modulating signal in response to said detector means, said signal being an integral multiple of the pulse repetition frequency 11. The radar transponder in accordance with claim 10 wherein said means for generating a modulating signal includes in combination:

an additional oscillator means; and means for phase-locking said additional oscillator means to said integer multiple of the pulse repetition frequency 12. In a radar transponder apparatus for receiving a sequence of interrogation pulses and generating reply pulses wherein the combination includes a continuous operating oscillator for developing a reference signal of a predetermined frequency; wherein said interrogation pulses are down converted to signal information at an intermediate frequency in the presence of the reference signal; the intermediate frequency signal being delayed; and wherein the delayed intermediate frequency signal information is up-converted to reply pulses in the presence of the reference signal, the improvement, which comprises:

the continuous running oscillator including a resonant circuit at the reference signal frequency;

means for incrementing the frequency of the continuous running oscillator by a predetermined amount, said means for incrementing the frequency including switching means for alternately switching at least one additional reactance element into said resonant circuit of the oscillator to alter the resonant frequency of the resonant circuit without significant alteration of the stored energy of the resonant circuits, the phase of the incremented frequency reference signal being related to the phase of the predetermined frequency reference signal and being substantially invariant from pulse-to-pulse of the interrogation pulses; and the delayed intermediate frequency signal information being up-converted to reply pulses in the presence of said incremented frequency reference signal, said reply pulses being offset in frequency and phase coherent with the interrogation pulses.

13. The radar transponder apparatus of claim 12 wherein said means for incrementing the frequency of the reference signal includes a delay circuit for delaying the intermediate frequency signal information so that said predetermined frequency of the reference signal does not change during the time interval that the interrogation pulses are applied to the radar transponder.

* * * * *